United States Patent Office 3,407,186
Patented Oct. 22, 1968

3,407,186
PYRIDINE ESTERS OF CARBOXYLIC ACIDS,
THEIR SYNTHESIS AND POLYMERS THEREOF
Howard C. Haas, Arlington, Mass., assignor to Polaroid
Corporation, Cambridge, Mass., a corporation of
Delaware
No Drawing. Filed June 4, 1965, Ser. No. 461,528
14 Claims. (Cl. 260—88.3)

ABSTRACT OF THE DISCLOSURE

A monomer of the structure

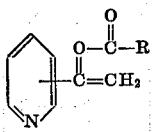

wherein R is a lower alkyl, prepared by oxidizing a vinylpyridine to form a 1,2-dihydroxyethylpyridine and reacting said 1,2-dihydroxyethylpyridine with an acid anhydride of the structure

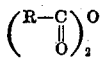

wherein R is a lower alkyl. The polymers of the said monomer are useful as film-forming materials.

---

The present invention is concerned with novel vinyl monomers and novel polymers comprising segments derived from said monomers.

One object of the present invention is to provide novel vinyl monomers.

Another object of the present invention is to provide novel processes for producing said monomers.

Still another object of the present invention is to provide novel polymers comprising segments derived from said monomers.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The novel monomers of the present invention are α-acyloxyvinyl pyridines of the structure

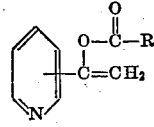

wherein R is lower alkyl, e.g., comprising less than 4 carbon atoms and preferably a methyl group.

As examples of compounds within the present invention, mention may be made of (1)

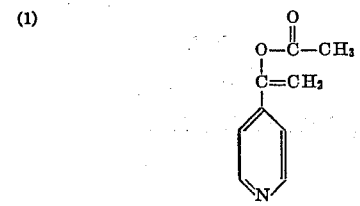

4-(α-acetoxyvinyl)-pyridine (2)

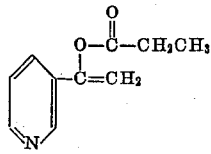

3-(α-propionyloxyvinyl)-pyridine (3)

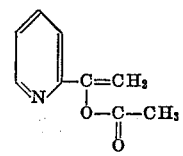

2-(α-acetoxyvinyl)-pyridine (4)

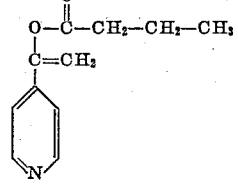

4-(α-butyryloxyvinyl)-pyridine

The monomers of the present invention may be prepared by a novel synthesis comprising oxidizing a vinylpyridine, e.g., a 2,3 or 4-vinylpyridine, to form the corresponding 1,2-dihydroxyethylpyridine and reacting the resulting 1,2-dihydroxyethylpyridine with an acid anhydride, e.g., acetic anhydride, propionic anhydride or butyric anhydride. The reaction may be illustrated by the following equations:

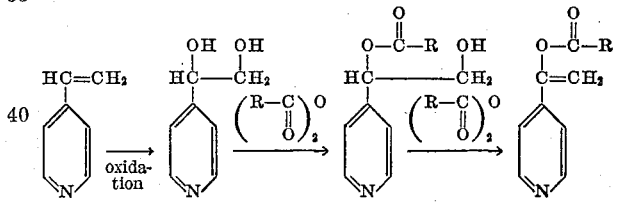

As can be noted in the above equations, the acid anhydride brings about both the esterification and the dehydration. The synthesis is especially useful in preparing the 4-substituted compounds in that the dehydration step takes place almost exclusively of a possible second esterification step which would produce a diester rather than the monomers of the present invention. It has been found that in the preparation of the 2-substituted compounds the diester reaction predominates and lesser amounts of the monomers of the present invention are produced.

In carrying out the above synthesis any oxidizing agent which will oxidize the vinyl group to an ethylene glycol group may be employed. Especially useful results have been obtained using cold dilute aqueous permanganate solutions as the oxidizing agent.

In preferred embodiments at least about 2 moles of the anhydride are used per mole of the glycol, and in especially preferred embodiments an amount in excess of 2 moles of the anhydride is used per mole of the glycol. Particularly good results were obtained using about a 5-fold excess of the anhydride.

The following nonlimiting examples illustrate the preparation of monomers within the scope of the present invention:

Example 1

With the temperature maintained at 0–5° C. and with efficient stirring, 0.5 mole of potassium permanganate, which was dissolved in 2 liters of water, was added slowly to 0.5 mole of 4-vinylpyridine. The total time of addition was about 2.5 hours. The resulting solution was neutralized with dilute sulfuric acid and filtered. The filtrate was evaporated to dryness under vacuum to provide the 4-(1,2-dihydroxyethyl)-pyridine as a pasty mass. A five-fold excess of acetic anhydride was added to the pastry mass and the reaction mixture was heated on a steam cone overnight. The excess acetic anhydride was distilled off under vacuum and the residue was fractionally distilled through a spinning band column. The resulting 4-(α-acetoxyvinyl)-pyridine had a boiling point of 76° C. at 0.5 mm. of mercury pressure $N_D^{25}=1.5324$ and showed the following elemental analysis:

Theoretical: C, 66.20; H, 5.52; N, 8.60. Found: C, 65.70; H, 5.50; N, 8.90.

Example 2

The procedure of Example 1 was repeated except that 2-vinylpyridine was used in place of the 4-vinylpyridine. Upon fractional distillation a small amount of 2-(α-acetoxyvinyl)-pyridine was obtained having a boiling point of 72° C. at 0.55 mm. of mercury pressure.

The monomers of the present invention may be homopolymerized or copolymerized with other polymerizable ethylenically unsaturated monomers to provide novel polymers comprising segments of the following structure:

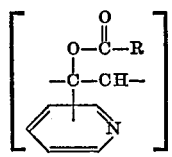

As examples of polymerizable ethylenically unsaturated monomers which can be copolymerized with the monomers of the present invention, mention may be made of the α,β-unsaturated carboxylic acids, esters, amides, anhydrides and nitriles, e.g., acrylic acid, α-chloroacrylic acid, methacrylic acid, crotonic acid, methyl acrylate, ethyl methacrylate, acrylamide, N,N-diethylmethacrylamide, N-hydroxymethyl acrylamide, acrylic anhydride and acrylonitrile; vinyl esters of carboxylic acids, e.g., vinyl acetate, vinyl butyrate, vinyl laurate and vinyl stearate; vinyl and vinylidene halides, e.g., vinyl chloride and vinylidene chloride; N-vinylimides, e.g., N-vinylphthalimide and N-vinylsuccinimide; ketones, e.g., methyl vinyl ketone and methyl isopropenyl ketone; maleic, fumaric, and itaconic acids and esters of such acids; diesters of polyhydric alcohols, e.g., the diacrylates and dimethacrylates of ethylene glycol, hexamethylene glycol and diethylene glycol; olefines such as butadiene and isoprene; and miscellaneous monomers such as styrene, nuclear substituted styrenes, e.g., methyl styrene, p-methoxystyrene and chlorostyrene, vinyl pyridine and N-vinyl pyrrolidone.

The following nonlimiting example illustrates the polymerization of monomers within the scope of the present invention:

Example 3

4-(α-acetoxyvinyl)-pyridine containing 0.3%, by weight, azo-bis-isobutyronitrile was sealed in a tube under vacuum and polymerized for two days at 65° C. The resulting polymer, a fairly dark colored solid, was purified by precipitation from methanol into diethyl ether. Examination of the infrared spectrum of a film of this polymer cast from methanol onto a silver chloride disc showed that the —C=C— stretching vibration present in the monomer at 1650 cm.⁻¹ was absent in the polymer.

The polymers prepared from the monomers of the present invention may be used as film-forming materials in end uses, such as photographic elements, and as mordants in color diffusion transfer processes, such as disclosed in U.S. Patent No. 2,983,606.

Since certain changes may be made in the above product and process without departing from the scope of the invention herein involved, it is intended that all matter contained in the above description shall be interpreted as illustrative and not in a limiting sense.

What is claimed is:
1. A monomer of the structure:

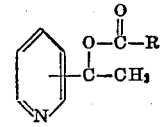

wherein R is a lower alkyl group.

2. A monomer as defined in claim 1 wherein R is a methyl group.

3. 4-(α-acetoxyvinyl)-pyridine.

4. 2-(α-acetoxyvinyl)-pyridine.

5. A polymer comprising segments of the structure:

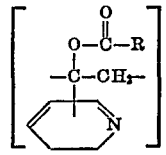

wherein R is a lower alkyl group.

6. A polymer as defined in claim 5 wherein R is a methyl group.

7. Poly-4-(α-acetoxyvinyl)-pyridine.

8. Poly-2-(α-acetoxyvinyl)-pyridine.

9. A process of forming a monomer as defined in claim 1, said process comprising oxidizing a vinylpyridine of the formula:

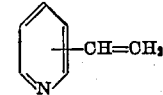

to form the corresponding 1,2-dihydroxyethylpyridine and reacting said 1,2-dihydroxyethylpyridine with an acid anhydride of the structure:

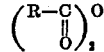

wherein R is a lower alkyl group.

10. A process as defined in claim 9 wherein at least 2 moles of said acid anhydride are used per mole of said 1,2-dihydroxyethylpyridine.

11. A process as defined in claim 10 wherein an amount in excess of 2 moles of said acid anhydride is used per mole of 1,2-dihydroxyethylpyridine.

12. A process of preparing α-acetoxyvinylpyridines, said process comprising oxidizing a vinylpyridine of the formula:

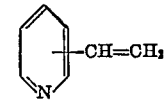

to form the corresponding 1,2-dihydroxyethylpyridine and reacting said 1,2-dihydroxyethylpyridine with acetic anhydride.

13. A process as defined in claim 12 wherein said vinylpyridine is 4-vinylpyridine.

14. A process as defined in claim 12 wherein potassium permanganate is used to oxidize said vinylpyridine.

No references cited.

JOSEPH L. SCHOFER, *Primary Examiner.*

HARRY WONG, Jr., *Assistant Examiner.*